United States Patent
Su et al.

(10) Patent No.: US 11,531,413 B1
(45) Date of Patent: Dec. 20, 2022

(54) WIRELESS INPUT SYSTEM

(71) Applicant: Primax Electronics Ltd., Taipei (TW)

(72) Inventors: Chun-Nan Su, Taipei (TW);
Chih-Feng Chien, Taipei (TW);
Yun-Jung Lin, Taipei (TW);
Chien-Nan Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/545,758

(22) Filed: Dec. 8, 2021

(30) Foreign Application Priority Data

Oct. 19, 2021 (TW) .................................. 110138772

(51) Int. Cl.
*G06F 3/038* (2013.01)
*H04W 76/10* (2018.01)
*G06F 3/0354* (2013.01)
*G06F 3/023* (2006.01)

(52) U.S. Cl.
CPC ............ *G06F 3/038* (2013.01); *G06F 3/0231* (2013.01); *G06F 3/03543* (2013.01); *H04W 76/10* (2018.02); *G06F 2203/0381* (2013.01); *G06F 2203/0384* (2013.01)

(58) Field of Classification Search
CPC .... G06F 3/038; G06F 3/0231; G06F 3/03543; G06F 2203/0381; G06F 2203/0384; H04W 76/10
See application file for complete search history.

(56) References Cited

U.S. PATENT DOCUMENTS

| 8,150,322 | B2* | 4/2012 | Lin | H04W 48/16 |
| | | | | 455/574 |
| 10,149,340 | B1* | 12/2018 | Rabii | H04W 76/25 |
| 10,412,481 | B1* | 9/2019 | Wu | H04R 5/033 |
| 2003/0197488 | A1* | 10/2003 | Hulvey | G06F 1/3203 |
| | | | | 320/135 |
| 2005/0027910 | A1* | 2/2005 | Barrett | H04W 4/18 |
| | | | | 710/62 |
| 2005/0065768 | A1* | 3/2005 | Karaoguz | G06F 3/0231 |
| | | | | 703/23 |
| 2005/0235159 | A1* | 10/2005 | Anandakumar | G06F 3/0383 |
| | | | | 710/72 |
| 2007/0019602 | A1* | 1/2007 | Wong | H04W 28/18 |
| | | | | 370/343 |

(Continued)

*Primary Examiner* — Ariel A Balaoing
(74) *Attorney, Agent, or Firm* — Kirton McConkie; Evan R. Witt (57) ABSTRACT

A wireless input system includes a first computer, a second computer, a first-mode wireless connection device, a first input device and a second input device. When the first-mode wireless connection between the first input device and the first-mode wireless connection device is established and the first-mode wireless connection between the second input device and the first-mode wireless connection device is established, the first input device and the second input device can be operated to control the first computer. When the second-mode wireless connection between the first input device and the second computer is established, the second input device can follow the first input device to perform a connection switching operation. Consequently, the second-mode wireless connection between the second input device and the second computer is established.

12 Claims, 4 Drawing Sheets

(56) References Cited

U.S. PATENT DOCUMENTS

| | | | | |
|---|---|---|---|---|
| 2007/0024585 A1* | 2/2007 | Tsai | ............... | G06F 3/03543 |
| | | | | 345/163 |
| 2008/0057990 A1* | 3/2008 | Fuccello | ............ | H04W 76/10 |
| | | | | 455/507 |
| 2010/0093280 A1* | 4/2010 | Ahn | ............... | H04W 52/46 |
| | | | | 455/67.11 |
| 2012/0238212 A1* | 9/2012 | Sangster | ............ | H04W 99/00 |
| | | | | 455/41.2 |
| 2013/0282932 A1* | 10/2013 | Robert | ............ | H04W 76/14 |
| | | | | 710/17 |
| 2017/0280458 A1* | 9/2017 | Lou | ............... | H04W 72/0486 |
| 2022/0015164 A1* | 1/2022 | Li | ............... | H04W 76/30 |

\* cited by examiner

WIRELESS INPUT SYSTEM

FIELD OF THE INVENTION

The present invention relates to a wireless input system, and more particularly to a wireless input system with plural input devices.

BACKGROUND OF THE INVENTION

With increasing development of science and technology, computers become essential tools in homes or workplaces. Generally, the computer is controlled by the user through an input device. For example, the input device is a touch screen, a keyboard, a mouse, or the like.

In order to improve the convenience and the practicality of the input devices, many input devices additionally have the wireless connection function. Consequently, without the spatial limitations, users can use the input devices to control the computers whenever and wherever they are. Moreover, through the wireless connection function, the user can operate a group of input devices (e.g., a wireless keyboard and a wireless mouse) to control plural computers. However, after the wireless keyboard and the wireless mouse are wirelessly connected with a first computer, some problems occur. For allowing the wireless keyboard and the wireless mouse to be wirelessly connected with a second computer, the wireless keyboard and the wireless mouse need to be wirelessly paired with the second computer. For example, the wireless keyboard and the wireless mouse are wirelessly paired with the second computer according to the paring records stored in the wireless keyboard, the wireless mouse or the second computer. In other words, the conventional wireless pairing method is not user-friendly, and the repetitive pairing procedures also waste the precious time of the user.

Therefore, there is a need of providing an improved wireless input system with a fast wireless switching function in order to overcome the drawbacks of the conventional technology.

SUMMARY OF THE INVENTION

The present invention provides wireless input system with a fast wireless switching function.

In accordance with an aspect of the present invention, a wireless input system is provided. The wireless input system includes a first computer, a second computer, a first-mode wireless connection device, a first input device and a second input device. The first computer includes an electrical interface. The second computer includes a second-mode wireless connection module. The first-mode wireless connection device is detachably installed in the electrical interface. The first input device includes a first wireless communication module. The second input device includes a second wireless communication module. Each of the first wireless communication module and the second wireless communication module includes a first-mode wireless connection unit and a second-mode wireless connection unit. A first-mode wireless connection between the first input device and the first-mode wireless connection device is established through the first-mode wireless connection unit of the first wireless communication module. The first-mode wireless connection between the second input device and the first-mode wireless connection device is established through the first-mode wireless connection unit of the second wireless communication module. When the first-mode wireless connection between the first input device and the first-mode wireless connection device is interrupted and a second-mode wireless connection between the first input device and the second-mode wireless connection module is established through the second-mode wireless connection unit of the first wireless communication module, the first-mode wireless connection device issues a first switching signal to the second input device. In response to the first switching signal, the second-mode wireless connection between the second input device and the second-mode wireless connection module is established through the second-mode wireless connection unit of the second wireless communication module.

In an embodiment, when the second-mode wireless connection between the first input device and the second-mode wireless connection module is interrupted and the first-mode wireless connection between the first input device and the first-mode wireless connection device is established again through the first-mode wireless connection unit of the first wireless communication module, the first-mode wireless connection device issues a second switching signal to the second input device. The first-mode wireless connection unit and the second-mode wireless connection unit of the second input device are switched to each other according to a Multi-Peripherals technology, so that the second input device receives the second switching signal. In response to the second switching signal, the first-mode wireless connection between the second input device and the first-mode wireless connection device is established through the first-mode wireless connection unit of the second wireless communication module.

In an embodiment, the first-mode wireless connection device is a 2.4G wireless connection device, and the first-mode wireless connection unit of the first wireless communication module and the first-mode wireless connection unit of the second wireless communication module are 2.4G wireless connection units.

In an embodiment, the second-mode wireless connection module is a Bluetooth wireless connection module, and the second-mode wireless connection unit of the first wireless communication module and the second-mode wireless connection unit of the second wireless communication module are Bluetooth wireless connection units.

In an embodiment, the first input device is a wireless keyboard, and the second input device is a wireless mouse.

In an embodiment, the first input device further includes a switching element. The first-mode wireless connection and the second-mode wireless connection are switched to each other when the switching element is triggered.

In accordance with another aspect of the present invention, a wireless input system is provided. The wireless input system includes a first computer, a second computer, a first-mode wireless connection device, a first input device and a second input device. The first computer includes an electrical interface. The second computer includes a second-mode wireless connection module. The first-mode wireless connection device is detachably installed in the electrical interface. The first input device includes a first wireless communication module. The second input device includes a second wireless communication module. Each of the first wireless communication module and the second wireless communication module includes a first-mode wireless connection unit and a second-mode wireless connection unit. A second-mode wireless connection between the first input device and the second-mode wireless connection module is established through the second-mode wireless connection unit of the first wireless communication module, and the second-mode wireless connection between the second input device and the second-mode wireless connection module is established through the second-mode wireless connection unit of the second wireless communication module. When the second-mode wireless connection between the first input device and the second-mode wireless connection module is interrupted and a first-mode wireless connection between the first input device and the first-mode wireless connection device is established through the first-mode wireless connection unit of the first wireless communication module, the first-mode wireless connection device issues a second switching signal to the second input device. The first-mode wireless connection unit and the second-mode wireless connection unit of the second input device are switched to each other according to a Multi-Peripherals technology, so that the second input device receives the second switching signal. In response to the second switching signal, the first-mode wireless connection between the second input device and the first-mode wireless connection device is established through the first-mode wireless connection unit of the second wireless communication module.

In an embodiment, when the first-mode wireless connection between the first input device and the first-mode wireless connection device is interrupted and the second-mode wireless connection between the first input device and the second-mode wireless connection module is established again through the second-mode wireless connection unit of the first wireless communication module, the first-mode wireless connection device issues a first switching signal to the second input device. In response to the first switching signal, the second-mode wireless connection between the second input device and the second-mode wireless connection module is established through the second-mode wireless connection unit of the second wireless communication module.

In an embodiment, the first-mode wireless connection device is a 2.4G wireless connection device, and the first-mode wireless connection unit of the first wireless communication module and the first-mode wireless connection unit of the second wireless communication module are 2.4G wireless connection units.

In an embodiment, the second-mode wireless connection module is a Bluetooth wireless connection module, and the second-mode wireless connection unit of the first wireless communication module and the second-mode wireless connection unit of the second wireless communication module are Bluetooth wireless connection units.

In an embodiment, the first input device is a wireless keyboard, and the second input device is a wireless mouse.

In an embodiment, the first input device further includes a switching element. The first-mode wireless connection and the second-mode wireless connection are switched to each other when the switching element is triggered.

From the above descriptions, the wireless input system of the present invention is advantageous over the conventional technology. While the wireless connection of the wireless input system is switched, the first-mode wireless connection device can selectively issue the first switching signal or the second switching signal to the second input device according to the connection status. Consequently, the second input device can follow the first input device to perform the connection switching operation in real time. In this way, the first input device and the second input device can be synchronously connected to the same computer. When compared with the conventional technologies, the procedure of wirelessly paring the computers and the input devices or the procedure of selecting the paring records can be omitted according to the technologies of the present invention. Consequently, the user can quickly and conveniently operate the same group of input devices to operate different computers.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
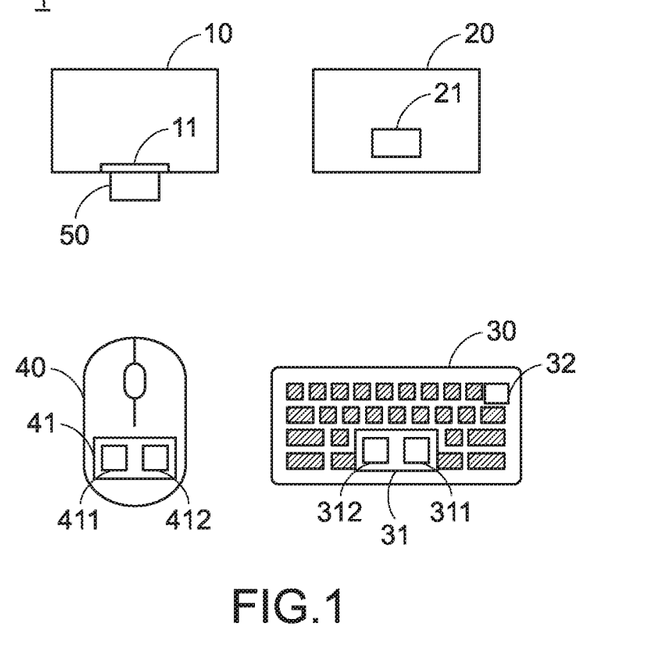
FIG. 1 schematically illustrates the architecture of a wireless input system according to an embodiment of the present invention.

FIG. 1 schematically illustrates the architecture of a wireless input system according to an embodiment of the present invention. As shown in FIG. 1, the wireless input system 1 comprises a first computer 10, a second computer 20, a first input device 30, a second input device 40 and a first-mode wireless connection device 50. The first computer 10 comprises an electrical interface 11. The first-mode wireless connection device 50 can be detachably installed in the electrical interface 11. For example, the electrical interface 11 is a USB port or a Lightning port. In addition, a second-mode wireless connection module 21 is built in the second computer 20. For example, the first computer 10 and the second computer 20 are desktop computers, notebook computers or tablet computers.

The first input device 30 comprises a first wireless communication module 31 and a switching element 32. The first wireless communication module 31 comprises a first-mode wireless connection unit 311 and a second-mode wireless connection unit 312. The second input device 40 comprises a second wireless communication module 41. The second wireless communication module 40 also comprises a first-mode wireless connection unit 411 and a second-mode wireless connection unit 412.

In an embodiment, the first input device 30 is a wireless keyboard, and the second input device 40 is a wireless mouse. In addition, the first-mode wireless connection device 50 is a 2.4G wireless connection device, the second-mode wireless connection module 21 is a Bluetooth wireless connection module, the first-mode wireless connection units 311 and 411 are 2.4G wireless connection units, and the second-mode wireless connection units 312 and 412 are Bluetooth wireless connection units. It is noted that the first input device 30 and the second input device 40 are not restricted to the wireless keyboard and the wireless mouse, respectively. According to the practical requirements, the first input device 30 and the second input device 40 may be replaced with any appropriate combination of two input devices. For example, in some embodiments, the first input device 30 and the second input device 40 are replaced with the combination of a wireless touchpad and a wireless keyboard or the combination of a wireless handwriting board and a wireless mouse.

Figure 2A:
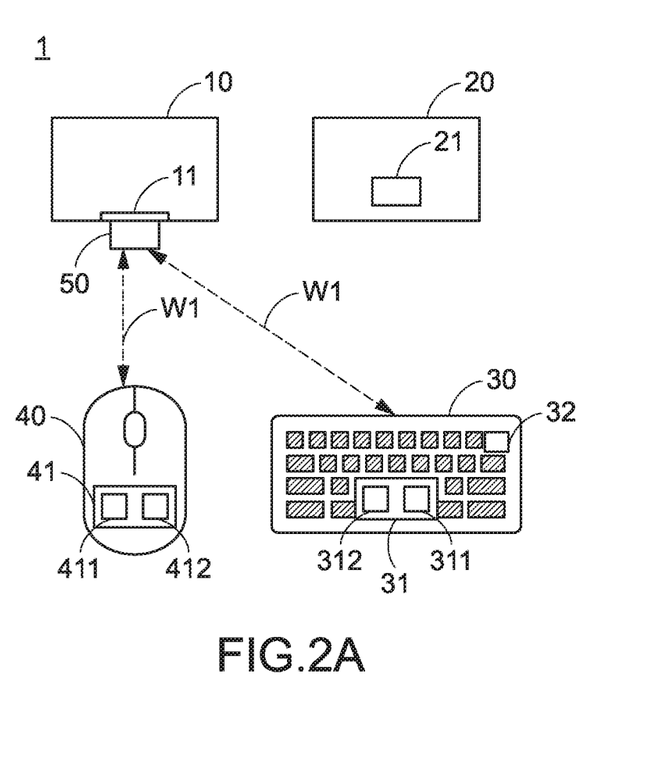
FIGS. 2A, 2B and 2C schematically illustrate the operations of the wireless input system of the present invention when switched from a first-mode wireless connection to a second-mode wireless connection.
Figure 2B:
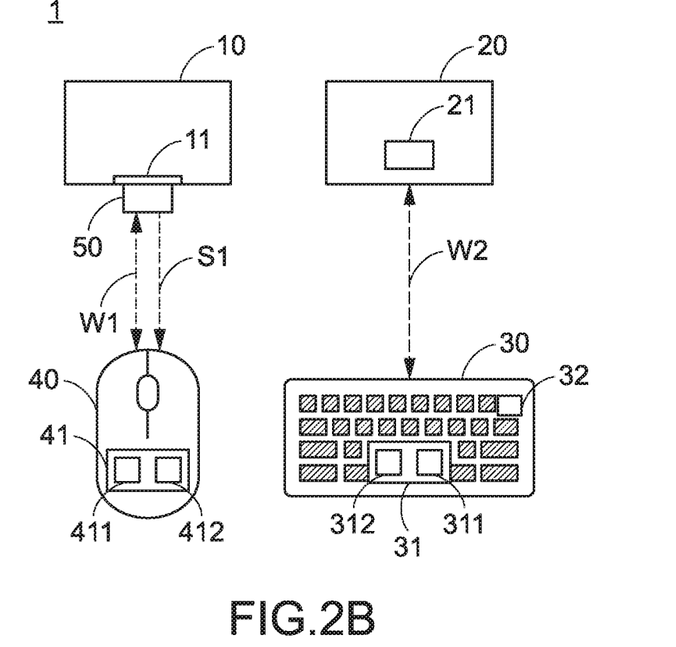
Figure 2C:
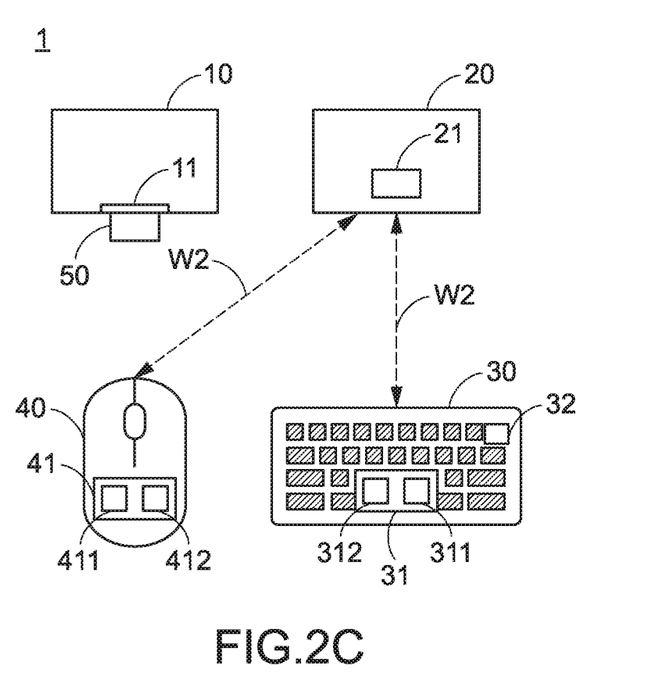

Please refer to FIGS. 2A, 2B and 2C. FIGS. 2A, 2B and 2C schematically illustrate the operations of the wireless input system of the present invention when switched from a first-mode wireless connection to a second-mode wireless connection.

As shown in FIG. 2A, the first-mode wireless connection W1 between the first input device 30 and the first-mode wireless connection device 50 and the first-mode wireless connection W1 between the second input device 40 and the first-mode wireless connection device 50 are established through the first-mode wireless connection units 311 and 411. Under this circumstance, the user can operate the first input device 30 and the second input device 40 to control the first computer 10. In an embodiment, the first-mode wireless connection W1 is a 2.4G wireless connection.

Please refer to FIG. 2B. After the switching element 32 is pressed down by the user, the first-mode wireless connection W1 between the first input device 30 and the first-mode wireless connection device 50 is interrupted. In addition, the second-mode wireless connection W2 between the first input device 30 and the second-mode wireless connection module 21 is established through the second-mode wireless connection unit 312. At the same time, the first-mode wireless connection device 50 issues a first switching signal S1 to the second input device 40.

Please refer to FIG. 2C. After the second input device 40 receives the first switching signal S1, the second input device 40 performs a connection switching operation. Consequently, the second-mode wireless connection W2 between the second input device 40 and the second-mode wireless connection module 21 is established through the second-mode wireless connection unit 412. Under this circumstance, the user can operate the first input device 30 and the second input device 40 to control the second computer 20. In an embodiment, the second-mode wireless connection W2 is a Bluetooth wireless connection.

In the above embodiment, the connection switching operation is triggered through the use of the switching element 32. It is noted that numerous modifications and alterations may be made while retaining the teachings of the invention. For example, in another embodiment, a switching command is inputted through a key of the first input device 30 (i.e., the wireless keyboard). In response to the switching command, the connection switching operation is triggered.

Figure 3A:
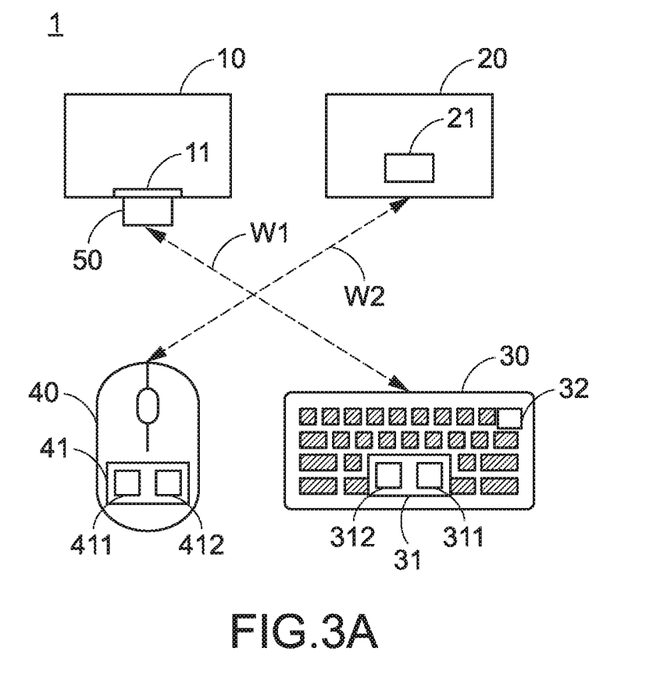
FIGS. 3A, 3B and 3C schematically illustrate the operations of the wireless input system of the present invention when switched from the second-mode wireless connection to the first-mode wireless connection.
Figure 3B:
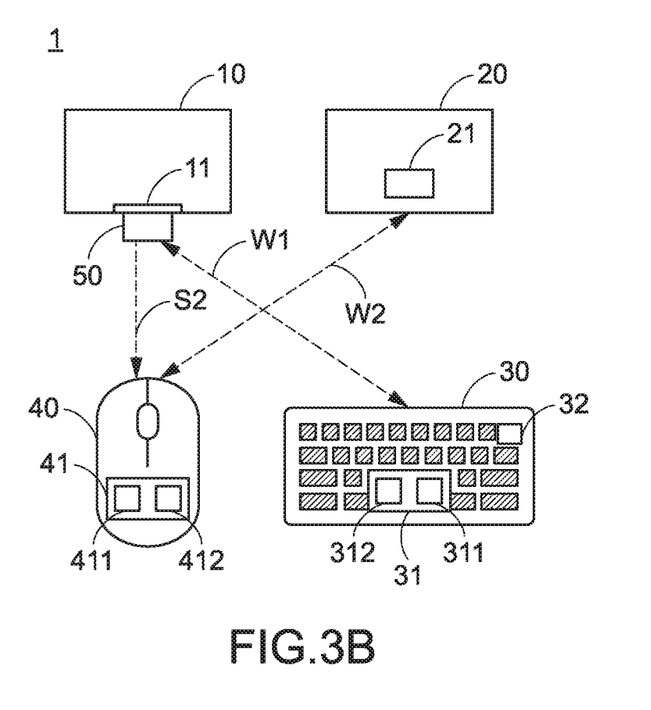
Figure 3C:
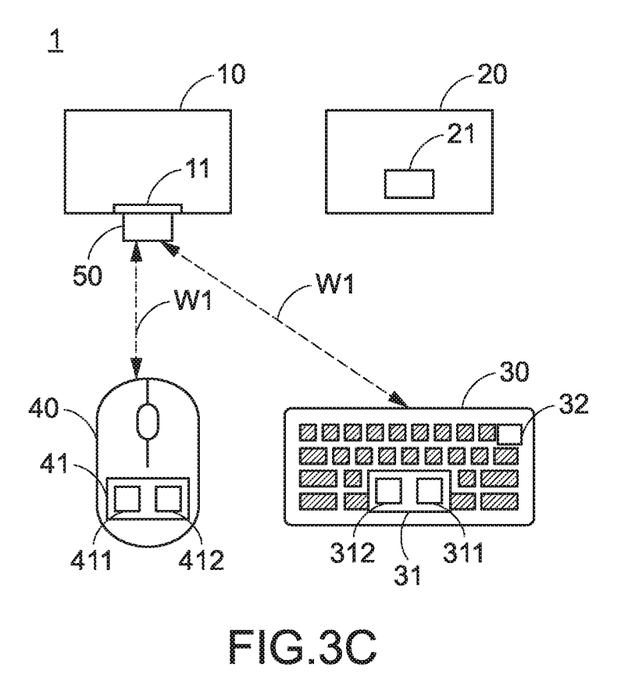

Please refer to FIGS. 3A, 3B and 3C. FIGS. 3A, 3B and 3C schematically illustrate the operations of the wireless input system of the present invention when switched from the second-mode wireless connection to the first-mode wireless connection.

Please refer to FIG. 3A. After the switching element 32 is pressed down by the user, the second-mode wireless connection W2 between the first input device 30 and the second-mode wireless connection module 21 is interrupted. In addition, the first-mode wireless connection W1 between the first input device 30 and the first-mode wireless connection device 50 is established again through the first-mode wireless connection unit 311.

Please refer to FIG. 3B. At the time when the first-mode wireless connection W1 between the first input device 30 and the first-mode wireless connection device 50 is established, the first-mode wireless connection device 50 issues a second switching signal S2 to the second input device 40.

In an embodiment, the associated control commands are previously written into a controller (not shown) or a firmware component (not shown) of the first-mode wireless connection device 50. Consequently, the first-mode wireless connection device 50 can selectively issue the first switching signal S1 or the second switching signal S2 to the second input device 40 according to the connection status.

Especially, when the second-mode wireless connection W2 between the second input device 40 and the second computer 20 is established, the first-mode wireless connection unit 411 and the second-mode wireless connection unit 412 of the second input device 40 are switched to each other according to a Multi-Peripherals technology. Consequently, the second input device 40 can receive the second switching signal S2 through the first-mode wireless connection unit 411 without influencing the second-mode wireless connection W2 between the second input device 40 and the second-mode wireless connection module 21 is established through the second-mode wireless connection unit 412.

Please refer to FIG. 3C. After the second input device 40 receives the second switching signal S2, the second input device 40 performs the connection switching operation. Consequently, the first-mode wireless connection W1 between the second input device 40 and the first-mode wireless connection device 50 is established again through the first-mode wireless connection unit 411. Under this circumstance, the user can operate the first input device 30 and the second input device 40 to control the first computer 10.

In the above embodiment, the first-mode wireless connection W1 is the 2.4G wireless connection, and the second-mode wireless connection W2 is the Bluetooth wireless connection. It is noted that the examples of the first-mode wireless connection W1 and the second-mode wireless connection W2 are not restricted.

From the above descriptions, the present invention provides the wireless input system. While the wireless connection of the wireless input system is switched, the first-mode wireless connection device can selectively issue the first switching signal or the second switching signal to the second input device according to the connection status. Consequently, the second input device can follow the first input device to perform the connection switching operation in real time. In this way, the first input device and the second input device can be synchronously connected to the same computer. When compared with the conventional technologies, the procedure of wirelessly paring the computers and the input devices or the procedure of selecting the paring records can be omitted according to the technologies of the present invention. Consequently, the user can quickly and conveniently operate the same group of input devices to operate different computers. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A wireless input system, comprising:
a first computer comprising an electrical interface;

a second computer comprising a second-mode wireless connection module;

a first-mode wireless connection device detachably installed in the electrical interface;

a first input device comprising a first wireless communication module; and a second input device comprising a second wireless communication module, wherein each of the first wireless communication module and the second wireless communication module comprises a first-mode wireless connection unit and a second-mode wireless connection unit, wherein a first-mode wireless connection between the first input device and the first-mode wireless connection device is established through the first-mode wireless connection unit of the first wireless communication module, and the first-mode wireless connection between the second input device and the first-mode wireless connection device is established through the first-mode wireless connection unit of the second wireless communication module, wherein when the first-mode wireless connection between the first input device and the first-mode wireless connection device is interrupted and a second-mode wireless connection between the first input device and the second-mode wireless connection module is established through the second-mode wireless connection unit of the first wireless communication module, the first-mode wireless connection device issues a first switching signal to the second input device, wherein in response to the first switching signal, the second-mode wireless connection between the second input device and the second-mode wireless connection module is established through the second-mode wireless connection unit of the second wireless communication module.

2. The wireless input system according to claim 1, wherein when the second-mode wireless connection between the first input device and the second-mode wireless connection module is interrupted and the first-mode wireless connection between the first input device and the first-mode wireless connection device is established again through the first-mode wireless connection unit of the first wireless communication module, the first-mode wireless connection device issues a second switching signal to the second input device, wherein the first-mode wireless connection unit and the second-mode wireless connection unit of the second input device are switched to each other according to a Multi-Peripherals technology, so that the second input device receives the second switching signal, wherein in response to the second switching signal, the first-mode wireless connection between the second input device and the first-mode wireless connection device is established through the first-mode wireless connection unit of the second wireless communication module.

3. The wireless input system according to claim 1, wherein the first-mode wireless connection device is a 2.4G wireless connection device, and the first-mode wireless connection unit of the first wireless communication module and the first-mode wireless connection unit of the second wireless communication module are 2.4G wireless connection units.

4. The wireless input system according to claim 1, wherein the second-mode wireless connection module is a Bluetooth wireless connection module, and the second-mode wireless connection unit of the first wireless communication module and the second-mode wireless connection unit of the second wireless communication module are Bluetooth wireless connection units.

5. The wireless input system according to claim 1, wherein the first input device is a wireless keyboard, and the second input device is a wireless mouse.

6. The wireless input system according to claim 1, wherein the first input device further comprises a switching element, wherein the first-mode wireless connection and the second-mode wireless connection are switched to each other when the switching element is triggered.

7. A wireless input system, comprising:

a first computer comprising an electrical interface;

a second computer comprising a second-mode wireless connection module;

a first-mode wireless connection device detachably installed in the electrical interface;

a first input device comprising a first wireless communication module; and a second input device comprising a second wireless communication module, wherein each of the first wireless communication module and the second wireless communication module comprises a first-mode wireless connection unit and a second-mode wireless connection unit, wherein a second-mode wireless connection between the first input device and the second-mode wireless connection module is established through the second-mode wireless connection unit of the first wireless communication module, and the second-mode wireless connection between the second input device and the second-mode wireless connection module is established through the second-mode wireless connection unit of the second wireless communication module, wherein when the second-mode wireless connection between the first input device and the second-mode wireless connection module is interrupted and a first-mode wireless connection between the first input device and the first-mode wireless connection device is established through the first-mode wireless connection unit of the first wireless communication module, the first-mode wireless connection device issues a second switching signal to the second input device, wherein the first-mode wireless connection unit and the second-mode wireless connection unit of the second input device are switched to each other according to a Multi-Peripherals technology, so that the second input device receives the second switching signal, wherein in response to the second switching signal, the first-mode wireless connection between the second input device and the first-mode wireless connection device is established through the first-mode wireless connection unit of the second wireless communication module.

8. The wireless input system according to claim 7, wherein when the first-mode wireless connection between the first input device and the first-mode wireless connection device is interrupted and the second-mode wireless connection between the first input device and the second-mode wireless connection module is established again through the second-mode wireless connection unit of the first wireless communication module, the first-mode wireless connection device issues a first switching signal to the second input device, wherein in response to the first switching signal, the second-mode wireless connection between the second input device and the second-mode wireless connection module is established through the second-mode wireless connection unit of the second wireless communication module.

9. The wireless input system according to claim 7, wherein the first-mode wireless connection device is a 2.4G wireless connection device, and the first-mode wireless connection unit of the first wireless communication module and the first-mode wireless connection unit of the second wireless communication module are 2.4G wireless connection units.

10. The wireless input system according to claim 7, wherein the second-mode wireless connection module is a Bluetooth wireless connection module, and the second-mode wireless connection unit of the first wireless communication module and the second-mode wireless connection unit of the second wireless communication module are Bluetooth wireless connection units.

11. The wireless input system according to claim 7, wherein the first input device is a wireless keyboard, and the second input device is a wireless mouse.

12. The wireless input system according to claim 7, wherein the first input device further comprises a switching element, wherein the first-mode wireless connection and the second-mode wireless connection are switched to each other when the switching element is triggered.

* * * * *